United States Patent
Crouzy

(10) Patent No.: US 10,288,195 B2
(45) Date of Patent: May 14, 2019

(54) CLIP FOR FASTENING A PIPE TO A SUPPORT

(71) Applicant: Airbus Operations SAS, Toulouse (FR)

(72) Inventor: Pierre Crouzy, Aussonne (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 15/884,949

(22) Filed: Jan. 31, 2018

(65) Prior Publication Data

US 2018/0224026 A1   Aug. 9, 2018

(30) Foreign Application Priority Data

Feb. 3, 2017   (FR) ...................................... 17 70112

(51) Int. Cl.
| | |
|---|---|
| *F16L 3/10* | (2006.01) |
| *F16L 33/12* | (2006.01) |
| *F16L 23/06* | (2006.01) |
| F16L 23/10 | (2006.01) |
| F16L 3/08 | (2006.01) |
| F16L 3/12 | (2006.01) |

(52) U.S. Cl.
CPC ........... *F16L 3/1075* (2013.01); *F16L 3/1025* (2013.01); *F16L 23/06* (2013.01); *F16L 33/12* (2013.01); *F16L 3/08* (2013.01); *F16L 3/12* (2013.01); *F16L 23/10* (2013.01)

(58) Field of Classification Search
CPC ......... F16L 3/1075; F16L 23/06; F16L 23/10; F16L 21/06; F16L 33/12; F16L 3/08; F16L 3/1025; F16L 3/12

USPC .............. 248/62, 74.1, 229.14, 230.8, 316.5; 285/420, 409, 252, 365
See application file for complete search history.

(56) References Cited

U.S. PATENT DOCUMENTS

| 144,997 | A | * | 11/1873 | Mayall ..................... F16L 33/02 |
| | | | | 285/252 |
| 196,807 | A | * | 11/1877 | Jolliffe et al. .......... F16L 23/06 |
| | | | | 285/409 |
| 667,808 | A | * | 2/1901 | Tackaberry ............. F16L 33/12 |
| | | | | 285/387 |
| 1,110,011 | A | * | 9/1914 | Schneider .............. F16L 27/111 |
| | | | | 24/270 |
| 1,303,098 | A | * | 5/1919 | Merz ....................... F16L 33/12 |
| | | | | 285/252 |

(Continued)

OTHER PUBLICATIONS

French Search Report, dated Sep. 21, 2017, priority document.

*Primary Examiner* — Jonathan Liu
*Assistant Examiner* — Taylor L Morris
(74) *Attorney, Agent, or Firm* — Greer, Burns & Crain, Ltd.

(57) ABSTRACT

A clip for fastening a pipe to a support, comprising a fixed part, a mobile part, a first joint connecting a first edge of the fixed part and a first end of the mobile part, and a system for holding the mobile part a closed state. The system comprises a lever and a second joint connecting the lever to a second end of the mobile part, and an angled U-shape connected to the second edge of the fixed part, configured to permit the lever and the second joint to pass through the angled U-shape and to permit the lever to be positioned in a folded position against an external face of the mobile part to hold the mobile part in the closed state.

14 Claims, 2 Drawing Sheets

(56) References Cited

U.S. PATENT DOCUMENTS

| | | | | |
|---|---|---|---|---|
| 1,442,209 A * | 1/1923 | Yoders | F16L 33/12 | 24/270 |
| 1,456,761 A * | 5/1923 | Bylund | F16L 33/12 | 285/238 |
| 1,662,311 A * | 3/1928 | Hamer | E21B 33/03 | 166/70 |
| 2,018,906 A * | 10/1935 | Winter | F16L 33/12 | 24/271 |
| 2,241,089 A * | 5/1941 | Hampe | F16L 21/06 | 285/332 |
| 2,292,310 A * | 8/1942 | Wilkins | B65D 63/06 | 206/503 |
| 2,579,975 A * | 12/1951 | Scott | B65D 45/345 | 24/270 |
| 2,752,174 A * | 6/1956 | Frost | F16L 23/06 | 24/270 |
| 2,775,806 A * | 1/1957 | Love | F16L 23/06 | 24/271 |
| 2,966,378 A * | 12/1960 | Carpenter | B65D 45/34 | 229/5.6 |
| 3,027,128 A * | 3/1962 | Liberty | F16L 3/12 | 24/20 TT |
| 3,144,262 A * | 8/1964 | Reynolds | F16L 33/12 | 285/311 |
| 3,201,156 A * | 8/1965 | Coats | F16L 23/06 | 24/273 |
| 3,228,714 A * | 1/1966 | Dricken | F16L 21/005 | 285/236 |
| 3,276,089 A * | 10/1966 | Cheever | F16L 33/12 | 24/270 |
| 3,280,846 A * | 10/1966 | Anderson | F16L 33/12 | 138/99 |
| 3,339,961 A * | 9/1967 | Schaefer | B65D 45/345 | 24/270 |
| 3,363,865 A * | 1/1968 | Metsker | E04D 13/08 | 24/193 |
| 3,520,563 A * | 7/1970 | Decker, Jr. | F16L 23/04 | 24/24 |
| 3,523,669 A | 8/1970 | Avallone | | |
| 3,637,257 A * | 1/1972 | Uncapher | B65D 45/345 | 220/321 |
| 3,705,737 A * | 12/1972 | Westerlund | F16L 23/06 | 24/271 |
| 3,797,079 A * | 3/1974 | Nixon | F16L 3/1075 | 24/285 |
| 3,828,403 A * | 8/1974 | Perrin | F16L 23/06 | 24/270 |
| 4,008,937 A * | 2/1977 | Filippi | F16L 23/06 | 174/78 |
| 4,093,283 A * | 6/1978 | Weinhold | F16L 21/08 | 285/243 |
| 4,382,570 A | 5/1983 | Craig | | |
| 4,465,330 A * | 8/1984 | De Cenzo | F16L 21/06 | 285/233 |
| 4,470,177 A * | 9/1984 | Ganung | A62C 33/04 | 24/270 |
| 4,492,005 A * | 1/1985 | Begley | F16L 3/1075 | 24/24 |
| 4,568,115 A * | 2/1986 | Zimmerly | F16L 23/10 | 24/285 |
| 4,657,284 A * | 4/1987 | Fiori | F16L 23/10 | 24/20 S |
| 5,136,757 A * | 8/1992 | Labonville | F16L 3/003 | 24/270 |
| 5,366,263 A * | 11/1994 | Hendrickson | F16L 17/04 | 24/270 |
| 5,380,052 A * | 1/1995 | Hendrickson | F16L 17/04 | 24/270 |
| 5,522,625 A * | 6/1996 | Flick | F16L 23/10 | 24/279 |
| 5,524,672 A * | 6/1996 | Mosing | B65D 59/00 | 138/110 |
| 5,548,876 A * | 8/1996 | Oetiker | B65D 63/02 | 24/271 |
| 5,829,106 A * | 11/1998 | Dams | B65D 45/345 | 24/270 |
| 5,873,611 A * | 2/1999 | Munley | F16L 23/10 | 24/20 W |
| 5,988,694 A * | 11/1999 | Brushaber | F16L 23/06 | 285/365 |
| 6,126,213 A * | 10/2000 | Jones | B65D 45/345 | 292/256.6 |
| 6,672,631 B1 * | 1/2004 | Weinhold | F16L 23/06 | 24/285 |
| 6,972,042 B2 * | 12/2005 | Benson | A61F 2/76 | 403/314 |
| 7,290,805 B2 * | 11/2007 | Wu | F16L 23/06 | 285/364 |
| 7,399,007 B2 * | 7/2008 | Wu | F16L 23/06 | 24/23 B |
| 7,614,593 B2 * | 11/2009 | McClure | E21B 17/1035 | 248/229.14 |
| 7,828,340 B2 * | 11/2010 | Heelan, Jr. | F16L 21/065 | 285/366 |
| 7,861,982 B1 * | 1/2011 | McClure | F16L 3/1075 | 248/229.14 |
| 7,883,121 B2 * | 2/2011 | Henry | F16L 23/10 | 285/367 |
| 8,006,711 B2 * | 8/2011 | Pietrzak | A45B 9/00 | 135/65 |
| 8,132,764 B2 * | 3/2012 | Kuipers | B62J 6/02 | 24/273 |
| 8,398,351 B2 * | 3/2013 | Hohmann | F16B 37/0821 | 411/432 |
| 8,844,881 B2 * | 9/2014 | West | F16L 3/1041 | 24/16 PB |
| 9,212,777 B2 * | 12/2015 | Shi | F16M 13/022 | |
| 2002/0008174 A1 * | 1/2002 | Fontaine | F16L 23/06 | 244/17.11 |
| 2006/0064853 A1 * | 3/2006 | Kurre | B65D 45/345 | 24/273 |
| 2009/0208277 A1 * | 8/2009 | Werth | A61M 39/1011 | 403/312 |
| 2011/0240078 A1 * | 10/2011 | Lenhart | A45B 9/00 | 135/75 |
| 2014/0294496 A1 * | 10/2014 | Gardiner | F16B 7/1454 | 403/374.2 |
| 2014/0360737 A1 | 12/2014 | Kim | | |
| 2015/0102600 A1 * | 4/2015 | Schooley | F16L 25/01 | 285/409 |
| 2015/0108288 A1 * | 4/2015 | Lee | A47B 96/1425 | 248/68.1 |
| 2017/0191589 A1 * | 7/2017 | Floyd | F16L 23/06 | |
| 2017/0248258 A1 * | 8/2017 | Kuo | F16L 23/06 | |

* cited by examiner

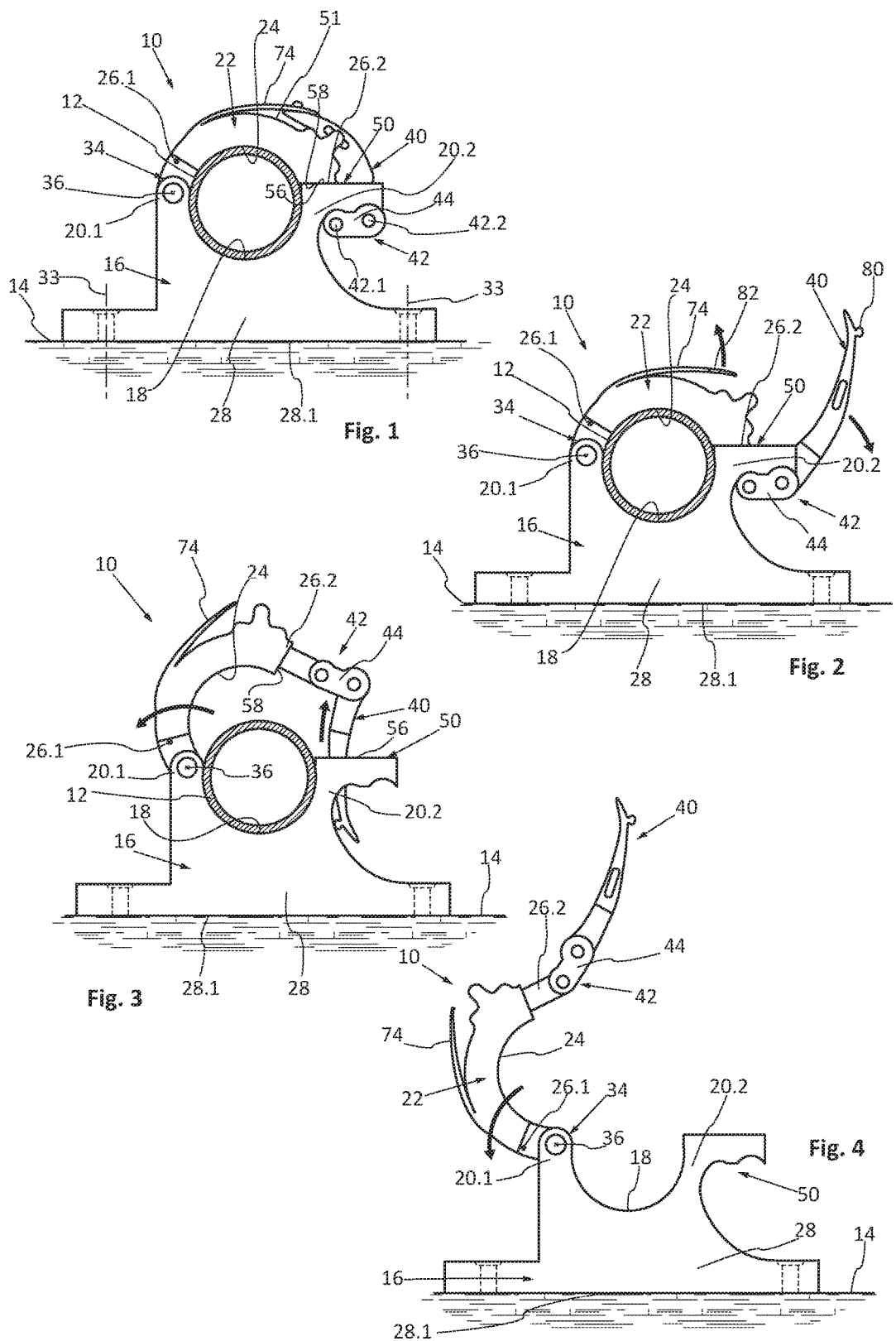

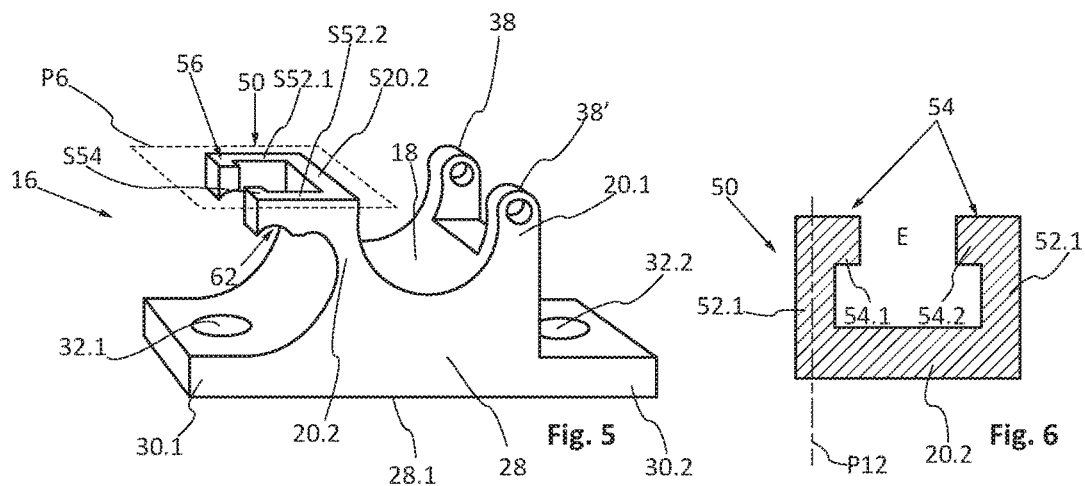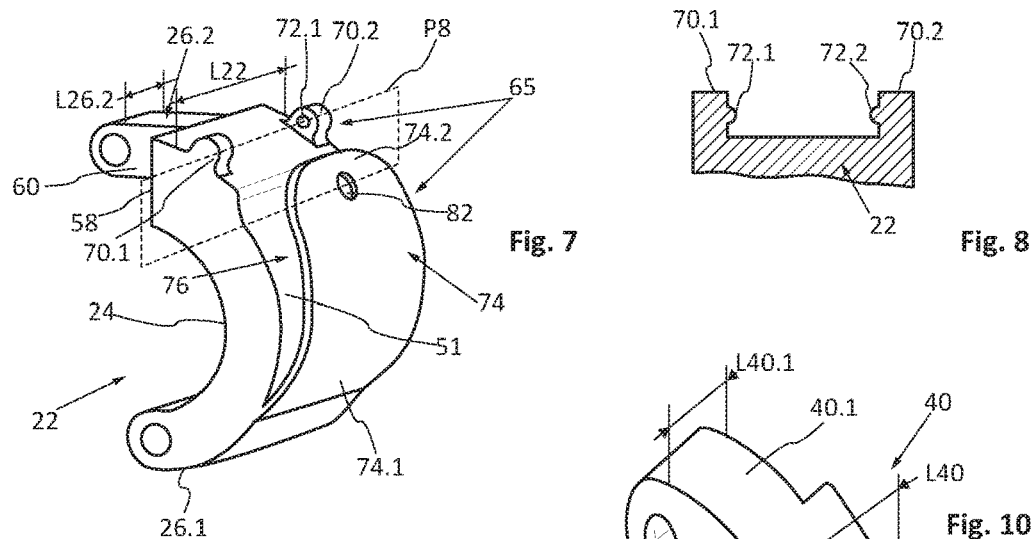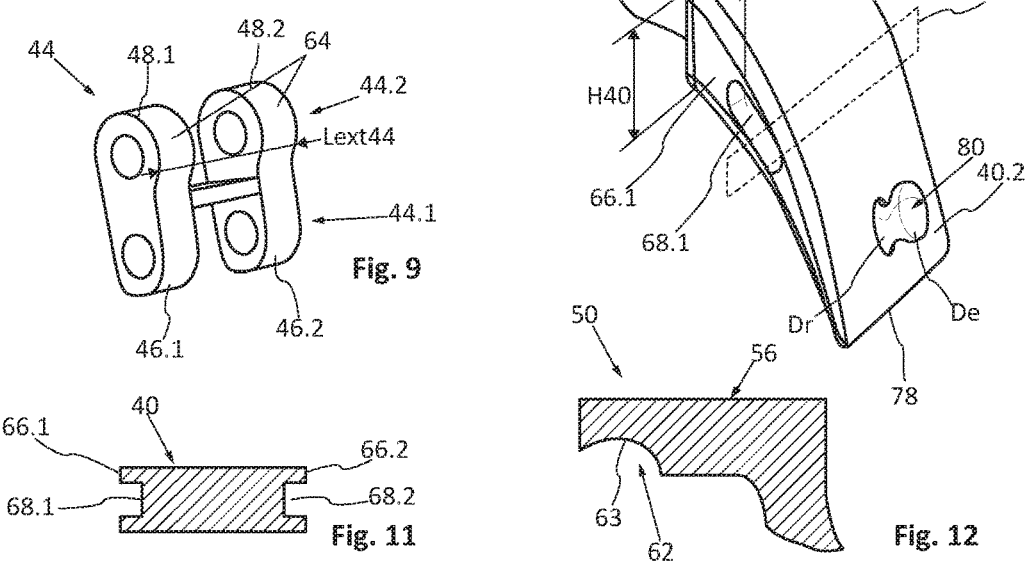

CLIP FOR FASTENING A PIPE TO A SUPPORT

CROSS-REFERENCES TO RELATED APPLICATIONS

This application claims the benefit of the French patent application No. 1770112 filed on Feb. 3, 2017, the entire disclosures of which are incorporated herein by way of reference.

BACKGROUND OF THE INVENTION

The present application relates to a clip for fastening a pipe to a support. Such a clip for fastening comprises:
- a fixed part, called the base, which is configured to be fixed to a support and which comprises a semi-cylindrical surface to receive a pipe and which extends between a first edge and a second edge,
- a mobile part which comprises a semi-cylindrical surface to receive the pipe and which extends from a first end to a second end, the mobile part being configured to occupy a first closed state in which the fixed and mobile parts are connected and clamp the pipe and an open state in which the mobile part is detached from the fixed part and permits the insertion of the pipe between the fixed and mobile parts or its withdrawal.

According to one configuration, the first edge of the first part and the first end of the mobile part are permanently connected by a pivot pin parallel to the axes of the semi-cylindrical surfaces of the fixed and mobile parts. Thus, the mobile part is configured to pivot relative to the fixed part.

According to this configuration, the clip comprises a system for holding the fixed and mobile parts in the closed state.

According to one embodiment, the system for holding comprises a bolt which connects the second end of the mobile part and the second edge of the fixed part in the closed state. This embodiment is unsatisfactory since it requires a tool to screw and unscrew the bolt in order to close and open the clip.

SUMMARY OF THE INVENTION

The present invention aims to remedy the drawbacks of the prior art.

To this end, the subject of the invention is a clip for fastening a pipe to a support, comprising:
- a fixed part which is configured to be fixed to the support and which comprises a semi-cylindrical surface to receive the pipe and which extends between a first edge and a second edge,
- a mobile part which comprises a semi-cylindrical surface to receive the pipe and which extends from a first end to a second end,
- a first joint which connects the first edge of the fixed part and the first end of the mobile part and which is configured to permit the mobile part to pivot relative to the fixed part between a closed state, in which the second edge of the fixed part and the second end of the mobile part are joined, and an open state, in which the second end of the mobile part is spaced apart from the second edge of the fixed part,
- a system for holding the mobile part in the closed state.

According to the invention, the system for holding comprises:
- a lever and a second joint which connects the lever to the second end of the mobile part,
- an angled U-shape connected to the second edge of the fixed part which is configured to permit a passage of the lever and the second joint and to permit the lever to be positioned in a folded position against an external face of the mobile part in order to hold the mobile part in the closed state.

This solution permits the clip for fastening to be closed without the need of a tool.

According to a further feature, the second joint comprises a link, a first pivot pin which connects the second end of the mobile part and the link, in addition to a second pivot pin which connects the link and the lever.

According to one configuration, the angled U-shape comprises two parallel branches which are connected to the second edge of the fixed part and spaced apart by a distance permitting the passage of the lever and the second joint, in addition to a crosspiece spaced apart from the second edge and comprising two parts, each connected to one of the branches, separated by a spacing which is less than the width of the mobile part and slightly larger than the width of a first end of the lever.

According to one embodiment, each part of the crosspiece comprises a holding face with a hollow cylindrical shape and the link comprises a portion which is configured to cooperate with the lever and which forms a clevis with two branches arranged on either side of a first end of the lever, each branch of the portion of the link comprising a cylindrical protruding shape which cooperates with the hollow cylindrical shape of the holding face.

According to a further feature, the clip for clamping comprises a locking system to hold the lever in the folded position, the locking system comprising at least one first shape provided in the region of the lever which cooperates with at least one second shape provided in the region of the mobile part.

According to one configuration, the locking system comprises hollows in the region of the edges of the lever, ears in the region of the external face of the mobile part, the lever being positioned therebetween in the folded position, and lugs, one for each ear, oriented toward one another and configured to be housed in the hollows when the lever is in the folded position.

According to a further configuration, the locking system comprises a tongue which has a joining zone with the mobile part which is oriented toward the first end of the mobile part and a free end which is oriented toward the second end of the mobile part, the tongue and the mobile part delimiting a housing which is configured to receive the lever in the folded position.

According to a further feature, the hollows provided on the edges of the lever have oblong shapes oriented along the length of the lever.

According to a further feature, the lever comprises a pin oriented toward the tongue when the lever is in the folded position and the tongue has a through-orifice which is configured to receive the pin when the lever is in the folded position.

According to one embodiment, the pin has a reduced diameter in the region of a joining zone with the lever and an increased diameter which is greater than the reduced diameter and spaced apart from the joining zone with the lever, the through-orifice of the tongue having a diameter which is less than the increased diameter and greater than or equal to the reduced diameter.

BRIEF DESCRIPTION OF THE DRAWINGS

Further features and advantages will be disclosed from the following description of the invention, the description being provided solely by way of example, with reference to the accompanying drawings, in which:

FIG. 1 is a front view of a clip for fastening which illustrates an embodiment of the invention in the closed state, FIGS. 2 and 3 are front views of the clip for fastening of FIG. 1 during opening, FIG. 4 is a front view of the clip for fastening of FIG. 1 in the open state, FIG. 5 is a perspective view of a fixed part of the clip for fastening visible in FIG. 1, FIG. 6 is a section along the plane 6 of FIG. 5, which illustrates a detail of the fixed part of the clip for fastening, FIG. 7 is a perspective view of a mobile part of the clip for fastening visible in FIG. 1, FIG. 8 is a section along the plane 8 of FIG. 7, which illustrates a detail of the mobile part of the clip for fastening, FIG. 9 is a perspective view of a link of the clip for fastening visible in FIG. 1, FIG. 10 is a perspective view of a lever of the clip for fastening visible in FIG. 1, FIG. 11 is a section along the plane 11 of FIG. 10, which illustrates a detail of the lever, and FIG. 12 is a section along the plane 12 of FIG. 6, which illustrates a detail of the fixed part of the clip for fastening.

DETAILED DESCRIPTION OF THE PREFERRED EMBODIMENTS

As illustrated in FIGS. 1 and 2, a clip for fastening 10 which is configured to connect a pipe 12 to a support 14 comprises:

a fixed part 16 called the base which is configured to be fixed to the support 14 and which comprises a semi-cylindrical surface 18 to receive a pipe 12 and which extends between a first edge 20.1 and a second edge 20.2, a mobile part 22 which comprises a semi-cylindrical surface 24 to receive the pipe 12 and which extends from a first end 26.1 to a second end 26.2.

For the present application, "pipe" is understood as a conduit, a tube or the like which approximately has a cylindrical shape which is generally hollow and which may be rigid or flexible.

For the remainder of the description, a longitudinal direction is parallel to the axis of the pipe 12 clamped by the clip for fastening 10. A width of an element corresponds to the dimension of this element clamped in a direction parallel to the longitudinal direction.

In the closed state, the semi-cylindrical surfaces 18, 24 of the fixed and mobile parts are coaxial and have an axis parallel to the longitudinal direction, merging with that of the pipe clamped by the clip.

The fixed part 16 is connected to the support by any appropriate means.

According to one embodiment, the fixed part 16 comprises a substantially parallelepipedal body 28 which has a first face 28.1 configured to bear against the support 14 and a second face opposing the first face 28.1 which comprises the semi-cylindrical surface 18. The body 28 comprises, in the extension of the first face 28.1, two tabs 30.1, 30.2 arranged on either side of the body 28 and each provided with a through-hole 32.1, 32.2 configured to house a shank of a fixing element 33, such as a bolt, a rivet or a screw, for example.

The clip for fastening 10 comprises a first joint 34 which connects the first edge 20.1 of the fixed part 16 and the first end 26.1 of the mobile part 22 and which is configured to permit the mobile part 22 to pivot relative to the fixed part 16 between a closed state (visible in FIG. 1) in which the second end 26.2 of the mobile part 22 and the second edge 20.2 of the fixed part 16 are joined and an open state (visible in FIG. 4) in which the second end 26.2 of the mobile part 22 is spaced apart from the second edge of the fixed part 16 to permit the insertion of the pipe 12 between the fixed and mobile parts 16, 22 or its withdrawal.

According to one embodiment, the first joint 34 is a rotary axle 36 parallel to the longitudinal direction, which connects the first end 26.1 of the mobile part 22 to the first edge 20.1 of the fixed part 16.

According to one embodiment which is visible in FIG. 5, in the region of the first edge 20.1 the fixed part 16 comprises a clevis which has two branches 38, 38', the first end 26.1 of the mobile part 22 being positioned therebetween. The branches 38, 38' of the fixed part 16 and the first end 26.1 of the mobile part 22 each comprise a through-orifice which is configured to house the rotary axle 36.

The clip for fastening 10 comprises a system for holding the mobile part 22 in the closed state.

This system for holding comprises a lever 40 and a second joint 42 which connects the lever 40 to the second end 26.2 of the mobile part 22.

According to one configuration, the second joint 42 comprises a link 44 and two pivot pins 42.1 and 42.2 parallel to the rotary axle 36, a first pivot pin 42.1 which connects the second end 26.2 of the mobile part 22 and the link 44 and a second pivot pin 42.2 which connects the link 44 and the lever 40.

According to one embodiment, the link 44 has an H-shape. A first portion 44.1 of the H-shape is configured to cooperate with the mobile part 22 and forms a clevis with two branches 46.1, 46.2, arranged on either side of the second end 26.2 of the mobile part 22 when the mobile part 22 and the link 44 are assembled. A second portion 44.2 of the H-shape is configured to cooperate with the lever 40 and forms a clevis with two branches 48.1, 48.2 arranged on either side of a first end 40.1 of the lever 40 when the link 44 and the lever 40 are assembled.

The second end 26.2 of the mobile part 22 has a width L26.2 which is less than the width L22 of the remainder of the mobile part 26 in order to be housed between the branches 46.1, 46.2 of the link 44. The first end 40.1 of the lever 40 has a width L40.1 which is less than the width L40 of the remainder of the lever 40 in order to be housed between the branches 48.1, 48.2 of the link 44. The link 44 has an external width Lext44 which is substantially equal to the width L22 of the mobile part 22 and the width L40 of the lever 40.

The system for holding the mobile part 22 in the closed state comprises an angled U-shape 50 which is connected to the second edge 20.2 of the fixed part 16 and which is configured to permit the passage of the lever 40 and the joint 42 and the positioning of the lever 40 in a folded position against an external face 51 of the mobile part 22 (opposite the semi-cylindrical surface 24) in order to hold the mobile part 22 in the closed state.

The angled U-shape 50 comprises:

two parallel branches 52.1, 52.2 which are connected to the second edge 20.2 of the fixed part 16 oriented in a direction perpendicular to the longitudinal direction and spaced apart by a distance slightly greater than the width L22 of the mobile part 22, the width L40 of the lever 40 and the external width Lext44 of the link 44, at least one crosspiece 54 which is connected to at least one branch 52.1, 52.2 and spaced apart from the second edge 20.2.

According to one embodiment, the crosspiece 54 is in two parts 54.1 and 54.2, each connected to one of the branches 52.1, 52.2, the spacing E between the two parts 54.1 and 54.2 of the crosspiece 54 being less than the width L22 of the mobile part 22, the width L40 of the lever 40 and the external width Lext44 of the link 44. The spacing E between the two parts 54.1 and 54.2 of the crosspiece 54 is slightly larger than the width L40.1 of the first end 40.1 of the lever 40 to permit the lever 40 to be correctly pressed against the mobile part 22 after passing into the angled U-shape 50.

The angled U-shape 50 comprises a bearing face 56 formed by coplanar surfaces S52.1, S52.2 and S54 of the branches 52.1, 52.2 and the crosspiece 54, the mobile part 22 bearing thereagainst in the closed state. In addition, the mobile part 22 comprises, on the one hand, a contact surface 58 which is configured to bear against the bearing face 56 of the fixed part 16 and, on the other hand, an extension 60 which protrudes relative to the contact surface 58 and which forms the second end 26.2 of the mobile part 22.

The crosspiece 54 comprises a holding face 62 opposing the bearing face 56, the link 44 bearing thereagainst when the mobile part 22 is in the closed state. The extension 60 and the distance between the bearing face 56 and the holding face 62 are dimensioned so that when the contact face 58 of the mobile part 22 is in contact with the bearing face 56, the second portion 44.2 of the link 44 is in contact with the holding face 62 of the crosspiece 54.

The holding face 62 advantageously has at least one hollow cylindrical shape 63 and the second portion 44.2 of the link 44 which cooperates with the holding face 62 comprises at least one protruding cylindrical shape 64 which is complementary to the hollow cylindrical shape 63.

According to one embodiment, each part 54.1 and 54.2 comprises a holding face 62 with a hollow cylindrical shape 63 and each branch 48.1 and 48.2 of the second part 44.2 of the link 44 comprises a cylindrical protruding shape 64 which cooperates with the hollow cylindrical shape 63 of the holding face 62. This configuration permits a pivoting movement to be obtained along an axis parallel to the longitudinal direction between the link 44 and the crosspiece 54, which promotes the traction of the mobile part 22 using the lever 40 as far as the closed state.

In addition to the angled U-shape 50, the clip for fastening 10 comprises a locking system 65 to hold the lever 40 in the folded position against the mobile part 22 and thus ensure the locking of the mobile part 22 in the closed state. This combination of the angled U-shape 50 and the locking system 65 permits the mobile part 22 to be held in the closed state.

This locking system 65 comprises at least one first shape which is provided in the region of the lever 40 and which cooperates with at least one second shape provided in the region of the mobile part 22.

According to a first embodiment, the lever 40 comprises a hollow 68.1, 68.2 in the region of each of its edges 66.1 and 66.2. In addition, the mobile part 22 comprises, in the region of the external face 51, two ears 70.1 and 70.2 separated by a distance which is substantially equal to the width L40 of the lever 40, the lever 40 being positioned therebetween in the folded position, and lugs 72.1 and 72.2, one for each ear 70.1 and 70.2, oriented toward one another and configured to be housed in the hollows 68.1 and 68.2 when the lever 40 is in the folded position. The ears 70.1 and 70.2 may be deformed in a resilient manner to permit the introduction or the withdrawal of the lugs 72.1 and 72.2 into or out of the hollows 68.1, 68.2.

According to a second embodiment, in the region of its external face 51, the mobile part 22 comprises a tongue 74 which comprises a joining zone 74.1 with the mobile part 22 oriented toward the first end 26.1 of the mobile part 22 and a free end 74.2 oriented toward the second end 26.2 of the mobile part 22. The distance between the tongue 74 and the external surface 51 of the mobile part 22 progressively increases until it reaches a maximum value in the region of the free end 74.2 of the tongue 74. Thus, the tongue 74 and the mobile part 22 delimit a housing 76 which is configured to receive the lever 40 in the folded position. In addition, the lever 40 has a height H40 which reduces from its first end 40.1 to its second end 40.2 which has a tapered edge 78.

This tongue 74 is flexible so as to promote the insertion of the lever 40 between the tongue 74 and the mobile part 22.

The hollows 68.1 and 68.2 provided on the edges of the lever 40 are oblong shapes oriented along the length of the lever 40 to permit the lever to slide on the external face 51 of the mobile part in the folded position and thus promote its insertion between the tongue 74 and the mobile part 22.

To reinforce the locking of the lever 40 in the folded position, the lever 40 comprises a pin 80 which protrudes relative to the surface 82 of the lever 40 oriented toward the tongue 74 in the folded position and the tongue 74 has a through-orifice 82 which is configured to receive the pin 80 when the lever 40 is in the folded position.

Preferably, the pin 80 has a reduced diameter Dr in the region of the joining zone with the lever 40 and an increased diameter De which is greater than the reduced diameter Dr and spaced apart from the joining zone with the lever 40. In addition, the through-orifice 82 has a diameter which is less than the increased diameter De and greater than or equal to the reduced diameter Dr. This configuration promotes the holding of the pin 80 in the through-orifice 82.

According to the circumstances, the first and second embodiments may be provided on the same clip for fastening 10 as illustrated in the figures.

The operating principle of the clip for fastening is now described with reference to FIGS. 1 to 4.

In the closed state, illustrated in FIG. 1, the pipe 12 is positioned between the fixed 16 and mobile 22 parts. The contact face 58 of the mobile part 22 is in contact with the bearing face 56 of the angled U-shape 50 and the cylindrical protruding shape 64 of the link 44 is positioned against the hollow cylindrical shape 63 of the angled U-shape 50.

The lever 40 is held in the folded position. To this end, the lugs 72.1 and 72.2 of the mobile part 22 are positioned in the hollows 68.1 and 68.2 of the lever 40; the lever 40 is positioned between the tongue 74 and the mobile part 22; and the pin 80 is positioned in the through-orifice 82.

To open the clip for fastening, in a first step as illustrated by FIG. 2, the tongue 74 is raised which causes the withdrawal of the pin 80 out of the through-orifice 82. The lever 40 is rocked which causes the withdrawal of the lugs 72.1 and 72.2 out of the hollows 68.1 and 68.2.

The mobile part 22 may then pivot as illustrated in FIG. 3 which causes the passage of the link 44 and of the lever 40 through the angled U-shape 50 until the complete opening of the clip for fastening 10 is achieved as illustrated in FIG. 4.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A clip for fastening a pipe to a support, comprising:
    a fixed part configured to be fixed to the support and comprising a body with a semi-cylindrical surface to receive the pipe and extending between a first edge and a second edge,
    a mobile part comprising a semi-cylindrical surface to receive the pipe and extending from a first end to a second end,
    a first joint connecting the first edge of the fixed part and the first end of the mobile part and being configured to permit the mobile part to pivot relative to the fixed part between a closed state in which the second edge of the fixed part and the second end of the mobile part are joined, and an open state in which the second end of the mobile part is spaced apart from the second edge of the fixed part, and
    a system holding the mobile part in the closed state, comprising:
        a lever and a second joint which connects the lever to the second end of the mobile part,
        an angled U-shape connected to the second edge of the fixed part which is configured to permit a passage of the lever and the second joint and to permit the lever to be positioned in a folded position against an external face of the mobile part to hold the mobile part in the closed state, wherein the angled U-shape is fixed with respect to the body of the fixed part when the mobile part pivots from the closed state to the open state, wherein the second joint comprises a link, a first pivot pin which connects the second end of the mobile part and the link, in addition to a second pivot pin which connects the link and the lever,
        a locking system to hold the lever in the folded position, said locking system comprising at least one first shape provided in a region of the level which cooperates with at least one second shape provided in a region of the mobile part, wherein the first shape comprises a tongue which has a joining zone with the mobile part oriented toward the first end of the mobile part and a free end oriented toward the second end of the mobile part, the tongue and the mobile part delimiting a housing configured to receive the lever in the folded position, and
        wherein the lever comprises a pin oriented toward the tongue when the lever is in the folded position and
        wherein the tongue has a through-orifice configured to receive the pin when the lever is in the folded position, and
        wherein the pin has a reduced diameter in a region of a joining zone with the lever and an increased diameter which is greater than a reduced diameter and spaced apart from the joining zone with lever, and
        wherein the through-orifice of the tongue has a diameter which is less than the increased diameter and greater than or equal to the reduced diameter.

2. The clip for fastening as claimed in claim 1, wherein the angled U-shape comprises two parallel branches and a crosspiece comprising two parts, the parallel branches connected to the second edge of the fixed part and spaced apart by a distance permitting passage of the lever and the second joint, and the crosspiece is spaced apart from the second edge, and each of the two parts of the crosspiece are connected to one of the two parallel branches, and are separated by a spacing which is less than a width of the mobile part, but slightly larger than a width of a first end of the lever.

3. The clip for fastening as claimed in claim 1, wherein each part of the crosspiece comprises a holding face with a hollow cylindrical shape and wherein the link comprises a portion which is configured to cooperate with the lever and which forms a clevis with two branches arranged on either side of a first end of the lever, each branch of the portion of the link comprising a cylindrical protruding shape which cooperates with the hollow cylindrical shape of the holding face.

4. The clip for fastening as claimed in claim 1, wherein the first shape comprises hollows in a region of edges of the lever, and the second shape comprises ears in a region of the external face of the mobile part, the lever being positioned therebetween in the folded position, and lugs, one for each ear, oriented toward one another and configured to be housed in the hollows when the lever is in the folded position.

5. The clip for fastening as claimed in claim 4, wherein the hollows provided on the edges of the lever have oblong shapes oriented along the length of the lever.

6. A clip for fastening a pipe to a support, comprising:
    a fixed part configured to be fixed to the support and comprising a semi-cylindrical surface to receive the pipe and extending between a first edge and a second edge,
    a mobile part comprising a semi-cylindrical surface to receive the pipe and extending from a first end to a second end,
    a first joint connecting the first edge of the fixed part and the first end of the mobile part and being configured to permit the mobile part to pivot relative to the fixed part between a closed state in which the second edge of the fixed part and the second end of the mobile part are joined, and an open state in which the second end of the mobile part is spaced apart from the second edge of the fixed part, and
    a system holding the mobile part in the closed state, comprising:
        a lever and a second joint which connects the lever to the second end of the mobile part, wherein the second joint comprises a link, a first pivot pin which connects the second end of the mobile part and the link, in addition to a second pivot pin which connects the link and the lever, and wherein the first pivot pin has a longitudinal axis parallel to a longitudinal axis of the second pivot pin; and an angled U-shape connected to the second edge of the fixed part which is configured to permit a passage of the lever and the second joint and to permit the lever to be positioned in a folded position against an external face of the mobile part to hold the mobile part in the closed state, wherein the angled U-shape comprises two parallel branches and a crosspiece comprising two parts, the parallel branches connected to the second edge of the fixed part and spaced apart by a distance permitting passage of the lever and the second joint, and the crosspiece is spaced apart from the second edge, and each of the two parts of the crosspiece are connected to one of the two parallel branches and are separated by a spacing which is less than a width of the mobile part, but slightly larger than a width of a first end of the lever.

7. The clip for fastening as claimed in claim 6, wherein each part of the crosspiece comprises a holding face with a hollow cylindrical shape and wherein the link comprises a portion which is configured to cooperate with the lever and which forms a clevis with two branches arranged on either side of a first end of the lever, each branch of the portion of the link comprising a cylindrical protruding shape which cooperates with the hollow cylindrical shape of the holding face.

8. The clip for fastening as claimed in claim 6, further comprising a locking system to hold the lever in the folded position, said locking system comprising at least one first shape provided in a region of the level which cooperates with at least one second shape provided in a region of the mobile part.

9. The clip for fastening as claimed in claim 8, wherein the first shape comprises hollows in a region of edges of the lever, and the second shape comprising ears in a region of the external face of the mobile part, the lever being positioned therebetween in the folded position, and lugs, one for each ear, oriented toward one another and configured to be housed in the hollows when the lever is in the folded position.

10. The clip for fastening as claimed in claim 9, wherein the hollows provided on the edges of the lever have oblong shapes oriented along the length of the lever.

11. The clip for fastening as claimed in claim 8, wherein the first shape comprises a tongue which has a joining zone with the mobile part oriented toward the first end of the mobile part and a free end oriented toward the second end of the mobile part, the tongue and the mobile part delimiting a housing configured to receive the lever in the folded position.

12. The clip for fastening as claimed in claim 11, wherein the lever comprises a pin oriented toward the tongue when the lever is in the folded position and wherein the tongue has a through-orifice configured to receive the pin when the lever is in the folded position.

13. The clip for fastening as claimed in claim 12, wherein the pin has a reduced diameter in a region of a joining zone with the lever and an increased diameter which is greater than a reduced diameter and spaced apart from the joining zone with the lever and wherein the through-orifice of the tongue has a diameter which is less than the increased diameter and greater than or equal to the reduced diameter.

14. A clip for fastening a pipe to a support, comprising:
a fixed part configured to be fixed to the support and comprising a semi-cylindrical surface to receive the pipe and extending between a first edge and a second edge,
a mobile part comprising a semi-cylindrical surface to receive the pipe and extending from a first end to a second end,
a first joint connecting the first edge of the fixed part and the first end of the mobile part and being configured to permit the mobile part to pivot relative to the fixed part between a closed state in which the second edge of the fixed part and the second end of the mobile part are joined, and an open state in which the second end of the mobile part is spaced apart from the second edge of the fixed part, and
a system holding the mobile part in the closed state, comprising:
a lever and a second joint which connects the lever to the second end of the mobile part, and
an angled U-shape connected to the second edge of the fixed part which is configured to permit a passage of the lever and the second joint and to permit the lever to be positioned in a folded position against an external face of the mobile part to hold the mobile part in the closed state,
wherein the angled U-shape comprises two parallel branches and a crosspiece comprising two parts, the parallel branches connected to the second edge of the fixed part and spaced apart by a distance permitting passage of the lever and the second joint, and the crosspiece is spaced apart from the second edge, and each of the two parts of the crosspiece are connected to one of the two parallel branches and are separated by spacing which is less than a width of the mobile part, but slightly larger than a width of a first end of the lever, and,
wherein the second joint comprises a link, a first pivot pin which connects the second end of the mobile part and the link, and a second pivot pin which connects the link and the lever,
wherein each part of the crosspiece comprises a holding face with a hollow cylindrical shape and wherein the link comprises a portion which is configured to cooperate with the lever and which forms a clevis with two branches arranged on either side of the first end of the lever, each branch of the portion of the link comprising a cylindrical protruding shape which cooperates with the hollow cylindrical shape of the holding face.

* * * * *